Patented Oct. 14, 1941

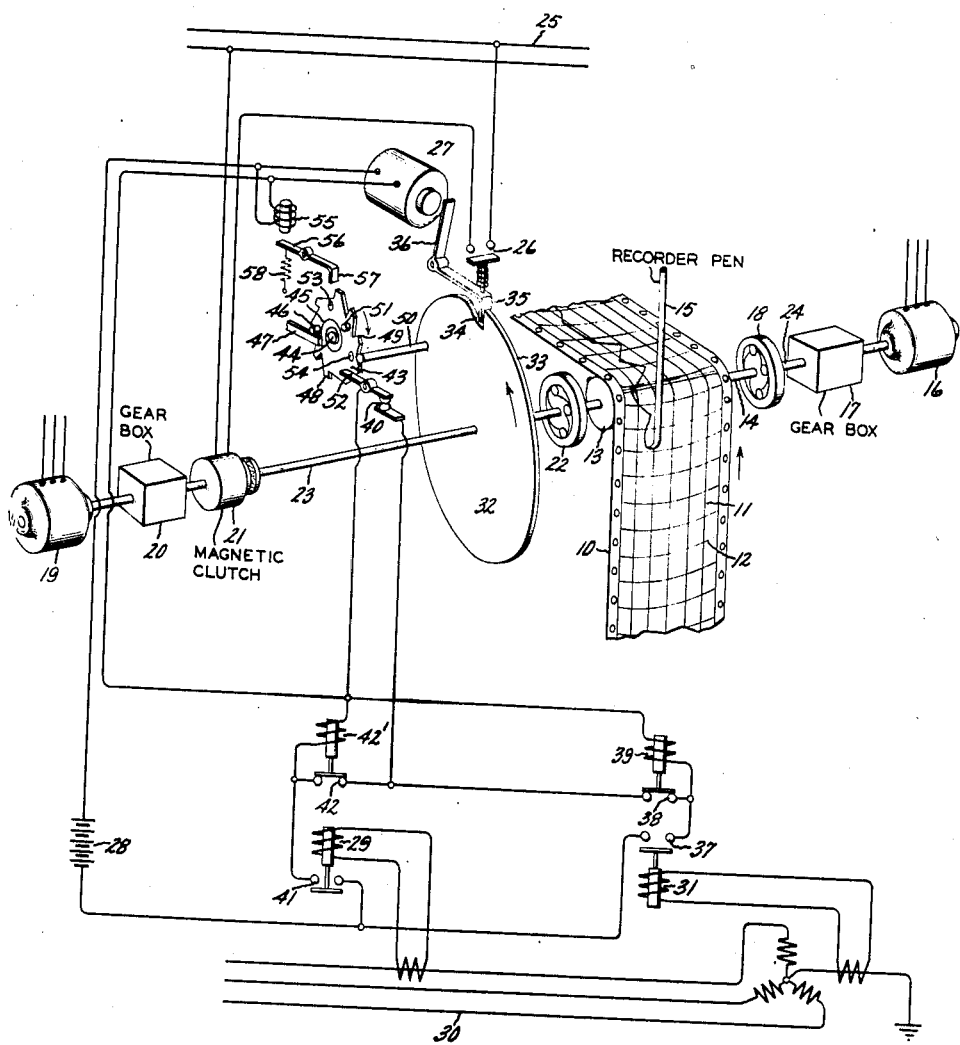

2,259,139

UNITED STATES PATENT OFFICE 2,259,139

RECORDING APPARATUS

Werner Oesinghaus, Berlin-Treptow, Germany, assignor to General Electric Company, a corporation of New York Application February 24, 1940, Serial No. 320,699
In Germany January 9, 1939

3 Claims. (Cl. 271—2.3)

This invention relates to recording apparatus and more particularly to recording devices of the type wherein the recording chart travels at a low linear speed under normal conditions; but which upon the occurrence of abnormal phenomena or disturbances on the system has its rate of travel considerably increased to expand the time scale on the chart during the emergency period.

While experience has shown that the majority of disturbances on electric power supply systems are of short duration, nevertheless, conditions often arise where the disturbance is of a continuous or semi-permanent nature, as illustrated by line faults to ground, for example. Under the latter circumstance the recording chart would be operated at a high speed until the disturbance is eliminated. Consequently, there is a large consumption of recording paper, often resulting in the dissipation of the entire length of the chart. This entails not only the increase in cost of the recording paper itself but also the inconvenience of replacement and the increased expense due to maintenance and more frequent inspection.

It is accordingly an object of my invention to provide, for use with apparatus of the foregoing character, a simple arrangement for automatically taking away from the high-speed drive the function of driving the chart under emergency conditions after the chart has travelled a predetermined maximum distance at high speed and transferring this function to the low speed drive, regardless of the continuation of the disturbance.

It is another object of my invention to provide a simple and improved arrangement whereby the chart which normally travels at low speed is driven at a high speed for a predetermined minimum period or distance of travel, once the high speed drive begins operation, regardless of the discontinuance of the disturbance or abnormal phenomena.

It is a further object of my invention to provide means for adjusting the predetermined maximum distance which the chart may travel at high speed during a single disturbance or abnormal condition.

It is still another object of my invention to provide a simplified and inexpensive arrangement whereby the means controlling the driving of the chart may be influenced by a plurality of disturbances of various character on an electrical system.

In accordance with my invention in its preferred form, I provide means for driving the chart at low speed under normal system conditions and I provide a high speed drive, the control of which is responsive to system conditions, for taking away the driving of the chart from the low speed drive in order that it may travel at a considerably higher speed in the event of a disturbance on the system. Once the high speed drive takes over the operation of the chart, a timing wheel driven at the high speed rate insures that the chart shall travel a predetermined minimum distance at high speed regardless of the discontinuance of the disturbance. This timing wheel also controls adjustable means for transferring the driving of the chart from the high speed to the low speed drive, after the chart has traveled a predetermined adjustable maximum distance at high speed, irrespective of the continuation of the disturbance. The apparatus is so constructed and arranged that it will respond to a plurality of faults of various character on the system.

The novel features which are characteristic of my invention are set forth with particularity in the appended claims. My invention, however, both as to its organization and its method of operation will be better understood from reference to the following specification when considered in connection with the accompanying drawing. In the drawing there is illustrated a diagrammatic view of a recording chart provided with both low and high speed driving mechanisms together with means for controlling the distance of travel of the chart under high speed conditions.

In the drawing I have illustrated a chart or sheet 10 which may be the recording surface of any graphic meter and which is provided with parallel longitudinal lines 11 and transverse lines 12. The transverse lines on the chart may be suitably spaced to correspond to a certain time interval, such for example as an hour, when the chart is traveling under normal low speed conditions. I preferably choose a speed of operation for the chart during the emergency period so that the ratio of the high speed to the low speed is 3600. With this ratio the spacing of the transverse lines which corresponds to an hour of chart travel at low speed will correspond to one second of chart travel at high speed. I wish to point out, however, that other ratios may be selected, if desired. The chart 10 is adapted to be engaged by a roller 13 which is driven from a rotary shaft 14. A pen 15, which may be operated by any type of measuring instrument, provides a record on the moving chart 10. The measuring instrument may be an electric meter, for example, which is responsive to any one of numerous quantities either associated or not associated with the electrical system which controls the operation of the movable recording chart.

I provide both low and high speed mechanisms for driving the rotary shaft 14 which controls the motion of the chart. In the arrangement illustrated, the low speed drive includes a constant speed motor 16, which is connected to drive the shaft 14 through suitable gearing 17 and a conventional overrunning clutch 18. The motor 16 and its associated gearing mechanism 17 may comprise a simple clockwork mechanism or I may employ any constant speed motor of any convenient type. The motor may be energized from any suitable source of power although I prefer that it receive its energy from a source of supply which is independent of the disturbances which control the transfer from the low speed to the high speed drive.

In the arrangement for driving the shaft 14 at high speed upon the occurrence of a disturbance, I provide a motor 19 which may be energized from the same source of supply as the motor 16. A train of gears 20 may also be employed, if necessary, for obtaining the proper speed relations. The motor 19 and its associated gearing mechanism 20 may be of the same type as the corresponding elements 16 and 17 of the low speed drive. A suitable clutch 21, here shown as one of the electromagnetic type, connects the high speed mechanism with the chart driving shaft 14 through a second overrunning clutch member 22. The clutch member 21 is normally deenergized and under such conditions the continuously running motor 16 drives the shaft 14 through the overrunning clutch 18 to advance the chart in the direction of the arrow, according to the illustration shown. The second overrunning clutch member 22 permits the shaft section 23 to remain stationary when the shaft 14 is being driven by the low speed mechanism. The constant speed motor 19 is maintained in continuous operation in order to eliminate the time which would be required for it to accelerate to full speed. Also, in the interest of bringing the chart up to high speed as quickly as possible after the beginning of the disturbance, the parts including the shaft section 23, the disk 32, the shaft 14, the roller 13, etc., are preferably constructed to have a low moment of inertia.

The overrunning clutch members 18 and 22 may be identical and of any suitable construction, the only requisite being that the slow speed mechanism shall drive the shaft 14 when the speed of the latter is less than that of the shaft section 24 and that the shaft 14 shall be permitted to overdrive the shaft 24 when the former is operated at a higher speed. The clutch member 22 permits the shaft 14 to overdrive the shaft 23 during normal conditions but serves to couple these shafts together for high speed operation of the chart 10 when the electromagnetic clutch 21 is energized.

The clutch member 21 is adapted to be energized from a suitable source of supply 25 and its energization is controlled by a pair of normally open contacts 26 operated by the armature of an electromagnetic relay 27. The relay 27 may be energized in response to a plurality of abnormal system conditions of various character to cause the high speed mechanism to take over the driving of the chart. In order to illustrate the principles of my invention, I have shown this relay supplied from a suitable source of supply 28 and its operation controlled by either a relay 29 which is responsive to overload conditions on the electrical system 30, or a relay 31 which is responsive to line-to-ground faults on the same system. I wish to emphasize, however, that the invention is not limited to any particular number of such relays.

I provide means for causing the high speed mechanism to drive the chart 10 after the disturbance has subsided for a period such that the total distance traveled by the chart corresponds to an integral number of divisions on the time scale corresponding to low speed travel, regardless of the period of subsistence of the disturbance. For example, if the divisions on the chart 10 are in hours, then I preferably select an integer such as 24 so that when slow speed operation is resumed the recording may be taken up at the same relative time on the chart as obtained at the beginning of the high speed operation. In the illustrated embodiment this means comprises a timing disk 32 driven by the shaft 23, the disk being in the form of a cam having a circular periphery or contour 33 and a peripheral notch or cut-away portion 34.

The cam 32 cooperates with a movable pawl 35 which is attached to a pivotally mounted armature 36 of the electromagnet 27. Under normal conditions, that is when the low speed mechanism is driving the chart 10, the pawl 35 is seated in the notch 34, as illustrated in the drawing. When the pawl 35 is removed from the notch due to energization of the electromagnet 27 the contacts 26 are closed, thereby energizing the clutch member 21. When the cam is advanced slightly in the direction of the arrow, the pawl 35 is no longer in registry with the notch 34, and even though the relay 27 becomes deenergized due to the discontinuance of the disturbance, the pawl will ride on the peripheral surface 33 until the cam and the notch are again in registry. During the time that the pawl is riding on the surface 33 the contact 26 remains closed, thereby maintaining the clutch 21 engaged until the high speed drive has been in operation long enough to rotate the disk or cam 32 at least one complete revolution, which as explained previously may correspond to 24 hours of chart travel at low speed.

In operation, so long as conditions are normal on the system 30, the relay 27 is denergized, the pawl 35 is in engagement with the notch 34, the contacts 26 are open thus maintaining the clutch 21 deenergized, and the shaft 14 controlling the travel of the chart 10 is driven at low speed through the overrunning clutch 18. Assume now that a disturbance occurs on the system 30, such as a line-to-ground fault, causing the relay 31 to close its contacts 37. The electromagnet 27 is immediately energized through a circuit including a pair of normally closed contacts 38 of a relay 39, a pair of normally closed contacts 40, the coil of electromagnet 27, the source of supply 28, and the contacts 37. (A similar circuit would be closed through contacts 41 of relay 29 and contacts 42 of relay 42′ in case the relay 29 should operate due to an overload on the system 30.) Consequently, the attraction of the armature 36 closes the contacts 26 and lifts the pawl from the notch 34. The clutch 21 is engaged and the overrunning clutch 22 begins to drive the shaft 14 and the chart 10 at high speed without any interference from the low speed drive, since the overrunning clutch 18 permits the shaft 14 to overrun the low speed shaft 24.

Assume that the disturbance which initiated the operation of the chart 10 at high speed does not last long enough for the disk 32 to complete a full revolution, which, with a 3600 to one ratio between the high and low speeds, corresponds to a period of 24 seconds. The relay 27 becomes deenergized but the pawl 35 continues to ride on the peripheral surface 33 to maintain the contacts 26 closed and the high speed drive in operation until the pawl 35 is in registry with the notch 34, at which time the pawl drops down, the contacts 26 open, and the driving of the chart 10 is resumed by the low speed mechanism. Thus, regardless of the time extent of the disturbance, whether for a period corresponding to less than one or more than one revolution of the disk 32, when the disturbance ceases, the cam 33 and the other parts including the pawl 35 assure continued operation of the chart at high speed until it occupies a position corresponding to the same hour and minute with respect to the pen 15 that it occupied at the beginning of the high speed operation.

It is preferable that the relay 27 and the fault responsive relays 29, 31, etc., be of the quick-acting type in order that the high speed driving of the chart may begin as promptly as possible after the disturbance arises.

In accordance with the arrangement thus far described, so long as the disturbance or fault persists on the system 30, the relay 27 remains energized and the high speed drive continues to drive the chart 10 at a hgh rate of speed. I provide simple means for interrupting the high speed drive after the disk has traveled a predetermined adjustable number of revolutions and transferring the driving of the chart 10 to the low speed mechanism, irrespective of the continuation of the disturbance on the system. In accordance with the illustrated embodiment this comprises a ratchet wheel or the like 43 rotatably mounted about a central pin 44 and biased by means of a helical spring 45 so that a projecting pin member 46 on the wheel 43 normally rests against an abutment or stop member 47. The disk-like wheel 43 is provided with a plurality of teeth or projections 48 having radial portions 49 adapted to cooperate with a pin 50 which extends from and is rotatable with the disk or cam 32. The ratchet wheel 43 is also provided with a second projecting pin or the like 51 which, upon sufficient rotation of the wheel 43 in the direction of the arrow, is adapted to strike a pivotally mounted member 52 to open the normally closed contacts 40. The pin 51 may be positioned at other radially spaced points on the wheel 43, such for example as 53 and 54 in order to control the degree of rotation of the wheel necessary for opening the contacts 40.

I provide a solenoid 55 for operating a pivotally mounted armature member 56 in order to control the position of a pawl member 57 which is adapted to engage the ratchet wheel 43. When the solenoid 55 is deenergized the pawl 57 is held out of engagement with the ratchet wheel by elastic means such as a spring 58. Inasmuch as the solenoid 55 is connected in shunt with the operating coil of the relay 27 it is likewise energized at the same time as the relay 27 in response to a disturbance on the system 30, as already explained.

The operating coils of electromagnetic relays 39 and 42' are short-circuited under normal conditions by contacts 38, 40 and 42, 40, respectively. These coils are of sufficiently high resistance so that when either of them is connected in circuit with the battery 28 the available potential for the operating coils of relays 27 and 55 is insufficient to maintain their respective armatures 36 and 56 in the "picked-up" position. From the foregoing description it will be appreciated that in the event of a disturbance, the solenoid 55 is energized thereby causing the pawl 57 to engage the ratchet wheel 43 and the latter is advanced in a clock-wise direction one step for each revolution of the disk 32 by means of the cooperation between the pin 50 and the radial portions 49 of the teeth or projections 48. If the wheel 43 is advanced a sufficient number of steps, the projecting pin 51 strikes the pivoted arm 52 to open the contacts 40, thereby removing the shunt from each of the coils of relays 39 and 42' and one of these coils depending upon which of the fault responsive coils 29 or 37 is energized will thus be energized to open its respective contacts. As stated previously, the number of steps which the wheel 43 must be advanced in order to open the contacts 40 may be adjusted to one, two, three, etc., by selectively positioning the pin 51 in one of the holes 53, 54, etc.

Assume now that a disturbance, such as the previously assumed line-to-ground fault, occurs on the system 30 and that this disturbance is one of long or semi-permanent duration. The relay 31 is energized thereby causing its contacts 37 to close and the high speed drive takes over the driving of the chart 10, as already explained. The disk 32 begins to rotate and, since the solenoid 55 is energized at the same time that the relay 27 is energized, the pawl 57 is drawn into engagement with the ratchet wheel 43. As the disk 32 rotates the ratchet wheel 43 is advanced in the direction of the arrow one step for each revolution of the pin 50 and eventually the pin 51 opens the contacts 40, causing energization of the high resistance relay 39. The contacts 38 are thereby opened, the attractive force of the relays 27 and 55 is reduced to such a value that they are no longer able to maintain their respective armatures in the picked-up position, the pawl 57 is therefore withdrawn from engagement with the ratchet wheel 43 by means of the spring 58, and the latter turns backward due to the force of the biasing spring until the pin 46 strikes the stop member 47. The contacts 40 close again but this has no effect on the operation because the contacts 38 are still open making it impossible to shunt the relay 39 until the disturbance ends. Since the relay 27 no longer produces sufficient force to hold its armature, the latter remains in the picked-up position only until the pawl 35, which rides the peripheral surface 33, is in registry with the notch 34, at which time the pawl 35 drops down into the notch 34. Consequently, the contacts 26 are opened and the driving of the chart 10 is taken over by the low speed drive as already explained at the same minute and hour on the chart that the high speed operation began except that it occurs on the chart one, two, three, etc., days later depending on the position of the pin 51.

Thus the maximum distance of travel of the chart 10 at high speed during a single fault may be limited to a predetermined adjustable maximum value regardless of the continuation of the disturbance. It will be seen that the relay 39 retains the interlocking of the timing wheel 32 as long as the disturbance lasts and the contacts 37 are closed. When the disturbance is over, the relay 39 loses its effect because it is deenergized by the opening of the contacts 37 and the shunt circuit including contacts 38 and 40 is restored.

It will be appreciated, however, that even though the assumed disturbance continues, the chart may nevertheless be operated again at high speed during this period in response to another abnormal condition such, for example, as an overload on the system 30. I have thus provided an arrangement of simple construction which requires only one timing device and a corresponding number of auxiliary relays to control the maximum distance of travel of the recording chart at high speed and which is responsive to a plurality of system disturbances.

While I have illustrated and described a particular embodiment of my invention for the purpose of explaining the principle of operation, it will be obvious to those skilled in the art that various modifications may be made without departing from the spirit of my invention and I, therefore, aim to cover all such modifications as fairly fall within the spirit and scope of my invention as set forth in the appended claims.

What I claim as new and desire to secure by Letters Patent of the United States is:

1. Means adapted to drive the movable chart of a recorder comprising a low speed mechanism for normally driving said chart, a high speed mechanism for driving said chart at a higher speed, said high speed mechanism being normally ineffective to drive said chart, means responsive to an abnormal condition for rendering said high speed mechanism effective to drive said chart, and means including an adjustable device driven by said high speed mechanism for rendering said high speed mechanism ineffective to drive said chart after said chart has traveled an adjustable predetermined maximum distance at high speed irrespective of the continuation of said abnormal condition.

2. The combination in apparatus adapted to drive the movable chart of a recording device of a low speed mechanism for normally driving said chart, a high speed mechanism for driving said chart at a higher speed, said high speed mechanism being normally ineffective to drive said chart, means responsive to an abnormal condition for rendering said high speed mechanism effective to drive said chart, and means including a ratchet wheel the rotation of which is determined by the distance traveled by said chart at high speed for rendering said high speed mechanism ineffective to drive said chart after said chart has traveled a predetermined distance at high speed irrespective of the continuation of said abnormal condition.

3. Means adapted to drive the movable chart of a recorder comprising a low speed mechanism for normally driving said chart, a high speed mechanism for driving said chart at a higher speed, said high speed mechanism being normally ineffective to drive said chart, electrical means adapted to be energized upon the occurrence of any one of a plurality of abnormal conditions for rendering said high speed mechanism effective to drive said chart, a normally closed switch member connected in circuit with said electrical means and normally shunting a high resistance relay adapted to be connected in said circuit, the resistance of said relay being of sufficient value that when said normally closed switch member is open the current in said electrical means is ineffective to control the operation of said high speed mechanism, and means for opening said switch member after said chart has traveled a predetermined distance at high speed for inserting said relay in circuit with said electrical means, said relay having interlocking means for preventing said electrical means from regaining control over the operation of said high speed mechanism throughout the existence of said abnormal condition.

WERNER OESINGHAUS.